United States Patent
Suitou et al.

(10) Patent No.: US 6,526,772 B2
(45) Date of Patent: Mar. 4, 2003

(54) APPARATUS AND METHOD FOR CONTROLLING ELECTRIC COMPRESSOR

(75) Inventors: Ken Suitou, Kariya (JP); Yasuharu Odachi, Kariya (JP); Kazuya Kimura, Kariya (JP); Masahiro Kawaguchi, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/041,872

(22) Filed: Jan. 7, 2002

(65) Prior Publication Data

US 2002/0088241 A1 Jul. 11, 2002

(30) Foreign Application Priority Data

Jan. 9, 2001 (JP) ........................ 2001-001485

(51) Int. Cl.[7] ............... F25B 1/00; F25B 19/00
(52) U.S. Cl. ..................... 62/228.4; 62/229
(58) Field of Search .................. 62/228.4, 229, 62/228.5, 228.1; 236/74 R

(56) References Cited

U.S. PATENT DOCUMENTS 4,893,479 A * 1/1990 Gillett et al. .................. 62/213
4,989,414 A * 2/1991 Murayama et al. ......... 62/228.4
5,950,443 A * 9/1999 Meyer et al. ............... 62/228.5

FOREIGN PATENT DOCUMENTS

| JP | 63-294466 | 12/1988 | |
| JP | 7-144531 | 6/1995 | ............ B60H/1/32 |
| JP | 2000-145652 | 5/2000 | ........... F04B/49/06 |

* cited by examiner

*Primary Examiner*—Denise L. Esquivel
*Assistant Examiner*—Marc Norman
(74) *Attorney, Agent, or Firm*—Morgan & Finnegan, LLP

(57) ABSTRACT

An electric compressor includes a motor and a compression mechanism that is driven by the motor. The compressor forms part of the refrigerant circuit of an air conditioner. A control apparatus of the compressor adjusts the rotation speed of the motor for controlling the amount of compressed refrigerant gas discharged from the compression mechanism, or the displacement of the compressor, per unit time. When the energy efficiency of the motor is lower than a predetermined level, the control apparatus performs on-off control by alternately turning off the motor. During the on-off control, a required amount of refrigerant gas discharged per unit time is obtained, and the energy efficiency of the motor in the on time is higher than the predetermined level.

8 Claims, 2 Drawing Sheets

ON-OFF Control

APPARATUS AND METHOD FOR CONTROLLING ELECTRIC COMPRESSOR

BACKGROUND OF THE INVENTION

The present invention relates to an apparatus and a method for controlling an electric compressor used in a vehicle air conditioner.

A typical electric compressor adjusts the speed of a motor by using an inverter, thereby controlling the displacement of refrigerant gas discharged from the compression mechanism per unit time. In the control using an inverter, it is difficult or impossible to actuate the motor below a lower limit rotational speed. Therefore, low displacement cannot be controlled by using an inverter. Thus, when the compressor displacement must be controlled in the range that is below the value corresponding to the lowest rotational speed of the motor, the motor is alternately turned on and off at a low speed that is close to the lowest speed. This procedure is referred to on-off control. The on-off control permits the compressor to operate in a low displacement range that cannot be obtained through inverter control.

However, when the compressor operates at a low speed that is close to the lowest speed of the inverter control, the energy efficiency of the motor and the inverter is low compared to a higher speed range of the motor. Such low speed operation of the motor therefore lowers the total energy efficiency of the compressor. Particularly, since an electric compressor used in a vehicle air conditioner is driven by the vehicle battery, the energy efficiency of the compressor must be increased to extend the period in which the air conditioning can be performed without charging the battery.

SUMMARY OF THE INVENTION

Accordingly, it is an objective of the present invention to provide an apparatus and a method for controlling an electric compressor that adjusts the compressor displacement in a wide range and improves the energy efficiency of the compressor.

To achieve the foregoing and other objectives and in accordance with the purpose of the present invention, a control apparatus for an electric compressor that includes a motor and a compression mechanism driven by the motor is provided. The compressor forms part of a refrigerant circuit of an air conditioner. The control apparatus adjusts the rotation speed of the motor for controlling the amount of refrigerant gas discharged from the compression mechanism per unit time. When the energy efficiency of the motor is predicted to be lower than a predetermined level, the control apparatus performs on-off control by alternately turning on and off the motor. During the on-off control, a required amount of refrigerant gas discharged per unit time is obtained, and the energy efficiency of the motor in the on time is higher than the predetermined level.

The present invention also provides a control method for controlling an electric compressor that includes a motor and a compression mechanism driven by the motor. The compressor forms part of a refrigerant circuit of an air conditioner. The rotation speed of the motor is adjusted for controlling the amount of refrigerant gas discharged from the compression mechanism per unit time. When the energy efficiency of the motor is predicted to be lower than a predetermined level, on-off control is performed by alternately turning on and off the motor. During the on-off control, a required amount of refrigerant gas discharged per unit time is obtained, and the energy efficiency of the motor in the on time is higher than the predetermined level.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An apparatus for controlling a scroll-type electric compressor according to one embodiment of the present invention will now be described. The scroll-type electric compressor is used in a vehicle air conditioner.

Figure 1:
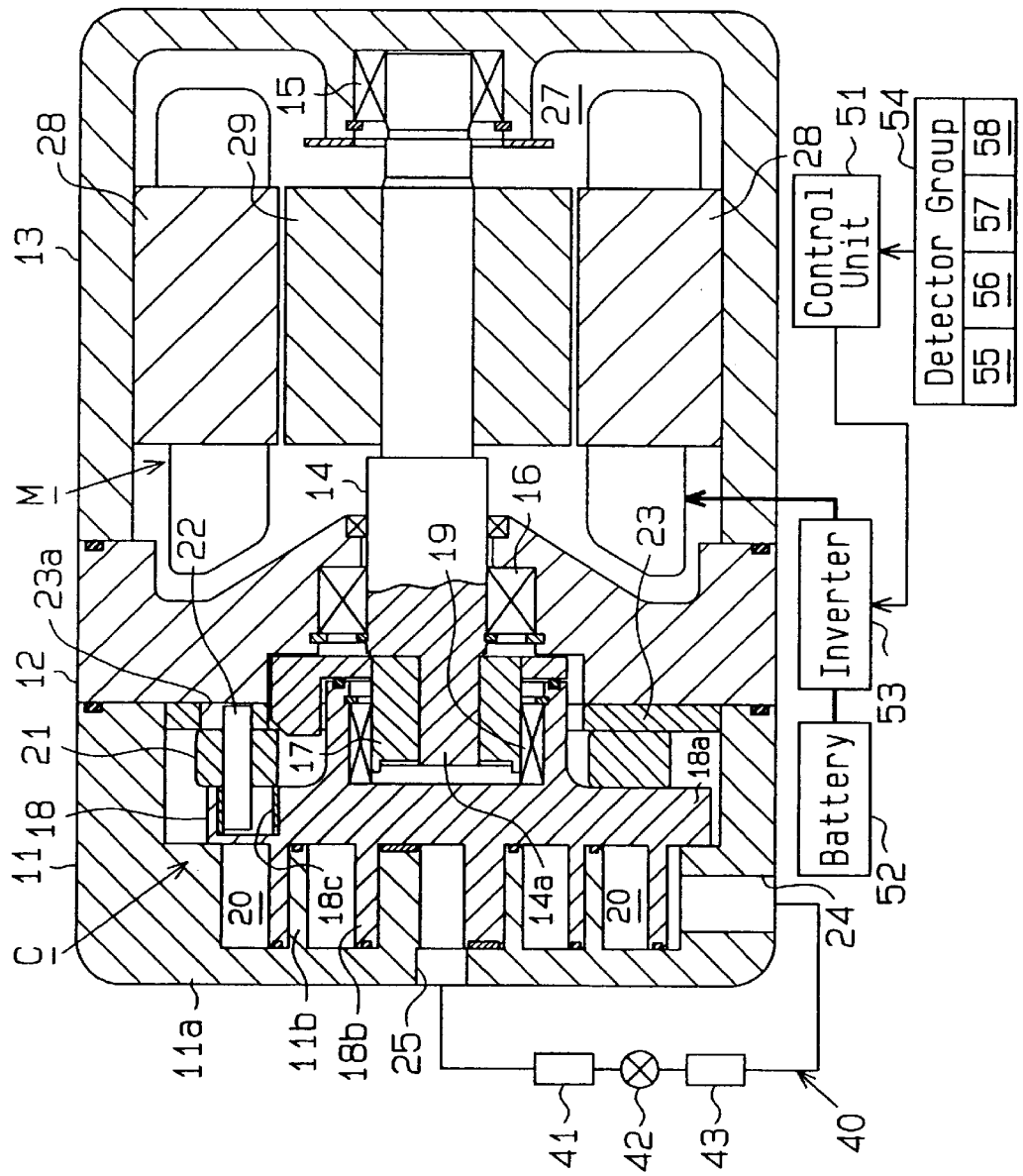
FIG. 1 is a cross-sectional view illustrating a scroll-type electric compressor.

As shown in FIG. 1, a refrigeration cycle of the vehicle air conditioner includes the scroll-type electric compressor and an external refrigerant circuit 40. The refrigerant circuit 40 includes, for example, a condenser 41, a decompression device and an evaporator 43. The decompression device is an expansion valve 42 in this embodiment. For purposes of illustration, the left in FIG. 1 is defined as the front side of the compressor and the right in FIG. 1 is defined as the rear side of the compressor.

As shown in FIG. 1, a center housing member 12 is coupled to the rear end of a fixed scroll 11. A motor housing member 13 is coupled to the rear end of the center housing member 12. The fixed scroll 11, the center housing member 12, and the motor housing member 13 form the housing of the compressor. The fixed scroll 11 includes a fixed base plate 11a and a fixed volute portion 11b, which projects from the base plate 11a.

A drive shaft 14 is rotatably supported by the center housing member 12 and the motor housing member 13 through bearings 15, 16. The drive shaft 14 includes a crankshaft 14a, which projects toward the fixed scroll 11. A bushing 17 is fitted about the crankshaft 14a. A movable scroll 18 is rotationally supported by the bushing 17 through a bearing 19. The movable scroll 18 includes a movable base plate 18a and a movable volute portion 18b, which projects from the movable base plate 18a. The volute portions 11b and 18b engage each other. The fixed base plate 11a, the fixed volute portion 11b, the movable base plate 18a, and the movable volute portion 18b define compression chambers 20.

An orbiting ring 21 is located between the center housing member 12 and the movable scroll 18. Cylindrical pins 22 (only one is shown in the drawing) are secured to the orbiting ring 21. The pins 22 extend beyond the thickness of the orbiting ring 21 and are equally spaced apart. An annular pressure receiving plate 23 is located between the center housing member 12 and the orbiting ring 21. The pressure receiving plate 23 has holes 23a, the positions of which correspond to the positions of the pins 22. Also, the movable base plate 18a has holes 18c, the positions of which correspond to the positions of the pins 22. The ends of each pin 22 are fitted in the corresponding pair of the holes 18c, 23a. The pins 22 and the holes 18c, 23a form an anti-rotation mechanism.

Therefore, when the crankshaft 14a rotates, the anti-rotation mechanism prevents the movable scroll 18 from rotating while permitting the movable scroll 18 to orbit.

An inlet 24 is formed in the outer wall of the fixed scroll 11. The refrigerant from the evaporator 43 flows through the inlet 24 and is enclosed between the fixed and movable scrolls 11, 18 to form the compression chamber at the outer periphery of the volute portions 11b, 18b. A discharge port 25 is formed in the center of the fixed base plate 11a of the fixed scroll 11. When the compression chamber 20 is located at the inner end of the volute portions 11b, 18b, the discharge port 25 connects the compression chamber 20 with the condenser 41.

Then, as the drive shaft 14 rotates, orbital motion of the movable scroll 18 moves the compression chamber 20 toward the inner end of the volute portions 11b, 18b, while decreasing the volume of the compression chamber 20. Accordingly, the refrigerant in the compression chamber 20 is compressed and consequently discharged to the external refrigerant circuit 40 through the discharge port 25. In this embodiment, the fixed scroll 11, the movable scroll 18, the drive shaft 14 and the anti-rotation mechanism 22, 18c, 23a form a compression mechanism C.

A motor chamber 27 is defined by the center housing member 12 and the motor housing member 13. A stator 28 is located in the motor chamber 27 and is secured to the inner wall of the motor housing member 13. A rotor 29 is secured to the drive shaft 14 and is located in the motor chamber 27. The rotor 29 faces the stator 28.

The stator 28 and the rotor 29 form an alternating-current motor, and more specifically, a synchronous motor. When alternating current is supplied to the stator 28, the rotor 29 and drive shaft 14 rotate integrally at a speed Nc that is synchronous with the frequency of the electricity source, which causes the compression mechanism C to compress refrigerant gas. In this embodiment, the stator 28, the rotor 29, and the drive shaft 14 form a motor M.

As shown in FIG. 1, the control apparatus includes a control unit 51 and a power source, which is a battery 52 in this embodiment, an inverter 53, and a group 54 of information detectors. The control unit 51 includes a central processing unit (CPU), a read only memory (ROM), a random access memory RAM, and an input-output interface. The inverter 53 is located between the battery 52 and the stator 28 of the motor M. The detector group 54 gathers information based on which the control unit 51 controls electricity supplied to the motor M.

The detector group 54 includes a temperature setter 55, a suction air temperature sensor 58, a discharge air temperature sensor 56, and a current measuring device 57. The temperature setter 55 is used for setting a target temperature in the passenger compartment. The suction air temperature sensor 58 detects the temperature of air that is sent to the evaporator 43 by a blower (not shown). The discharge air temperature sensor 56 detects the temperature of air that is blown into the passenger compartment through the evaporator 43. The current measuring device 57 measures current that is supplied to the stator 28.

The control unit 51 actuates the inverter 53 according to detected information from the detector group 54, thereby converting direct current of the battery 52 into alternating current. The control unit 51 supplies the alternating current to the stator 28 and also changes the frequency of the alternating current. When the current frequency is changed, the speed Nc of the rotor 29 (the drive shaft 14), which is synchronous with the current frequency, is changed. This changes the amount of compressed refrigerant gas that is discharged from the compression chamber 20 of the compression mechanism C per unit time, or the displacement of the compression mechanism C.

The control unit 51 determines the target temperature of air blown out of the air conditioner, or the temperature of air supplied to the passenger compartment, based on temperature information supplied by the detector group 54. The temperature information includes, for example, the temperature of air drawn into the air conditioner, the temperature of the blown air, and the target temperature of the passenger compartment. The control unit 51 determines the target speed of the motor M, or the target displacement of the compression mechanism C, based on the difference between the target value and the current value of the temperature of the blown air. The control unit 51 commands the inverter 53 to operate at the frequency corresponding to the target motor speed. Accordingly, the speed Nc of the motor M, that is, the displacement of the compression mechanism C, is adjusted according to the cooling load such that the temperature of the blown air seeks the target temperature.

Figure 2:
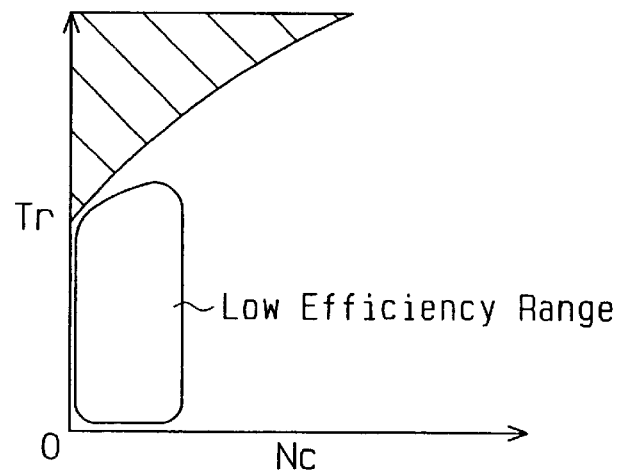
FIG. 2 is a map for judging the energy efficiency of the motor shown in FIG. 1.

The control unit 51 has a map shown in FIG. 2 for judging whether the energy efficiency of the motor M (ratio of output energy to input energy) is less than a predetermined level. In this map, the output torque Tr of the motor M and the speed Nc of the drive shaft 14 are used as parameters. In this embodiment, the output torque Tr is estimated based on the current value information from the current measuring device 57, and the speed Nc of the drive shaft 14 is estimated based on the current frequency of the signal sent to the inverter 53. This procedure, in which the map is used for judging whether the energy efficiency of the motor M is less than the predetermined level, reduces the computation load on the control unit 51 compared to a procedure that involves successive calculations of equations. The diagonally shaded range of the map shown in FIG. 2 represents the combinations of the output torque Tr and the speed Nc that never occur because of the construction of the motor M.

Figure 3:
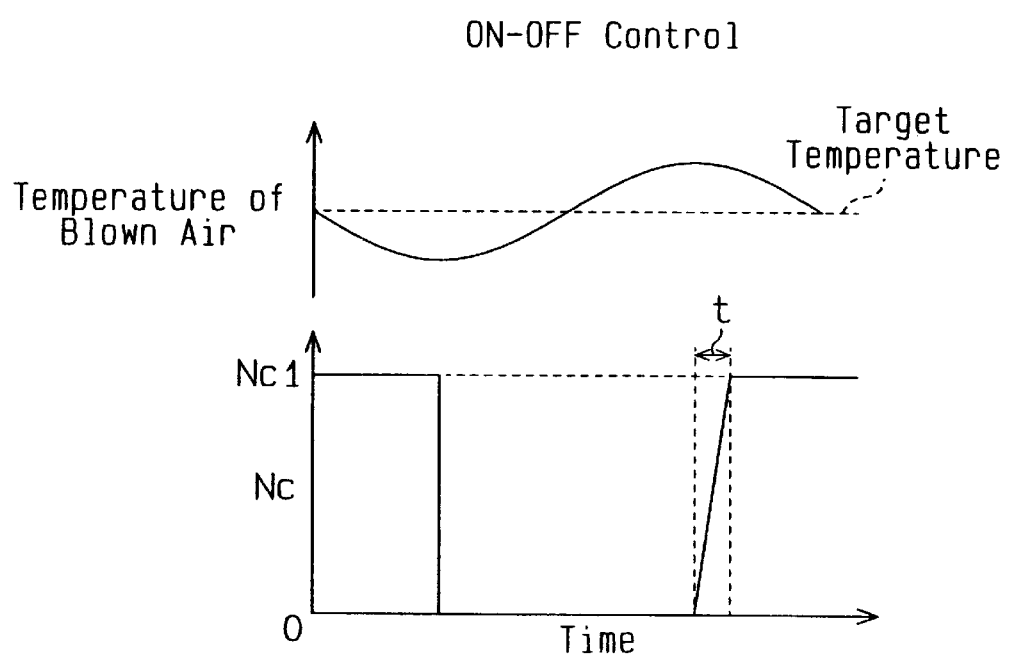
FIG. 3 is a timing chart illustrating on-off control.

When judging that the energy efficiency of the motor M is less than the predetermined level based on the map of FIG. 2, the control unit 51 switches the control procedure of the motor M (the inverter 53) from the rotational speed control to the on-off control as shown in FIG. 3. The on-off control refers to a procedure in which the motor M is alternately turned on and off. When turned on, the motor M is controlled to operate at a predetermined speed Nc1, which has preferred energy efficiency.

The energy efficiency of the motor M falls below the predetermined level generally when the cooling load is small. Therefore, the motor output torque Tr in on time during the on-off control fluctuates in a low and narrow range. Therefore, if the speed Nc1 of the on time is a constant value that is obtained through experiments as in the present embodiment, the motor M hardly operates at an energy efficiency range lower than the predetermined level. Thus, setting the speed Nc1 to a constant value practically causes little problem. A constant value of the speed Nc1 reduces the computation load on the control unit 51 compared to a procedure in which the most efficient motor speed Nc of the on-off control is computed in every on time based on the output torque Tr and the speed Nc of the previous on time.

When detecting that the temperature of blown air is higher than the target temperature by a predetermined amount, the control unit 51 starts the motor M to increase the motor speed Nc from zero to the predetermined speed Nc1. Therefore, the temperature of the blown air starts to be reduced. When detecting that the temperature of blown air is lower than the target temperature by a predetermined amount, the control unit 51 stops the motor M. This causes the temperature of the blown air to start to be increased. In this manner, the operating time (the on time) of the motor M per unit time, that is, the displacement of the compression mechanism, is adjusted according to the cooling load such that the temperature of the blown air seeks the target temperature.

In FIG. 3, the sign t represents a period in which the speed of the motor M is increased from zero to the speed Nc1. The control unit 51 changes the length of the period t based on the cooling load, which is indicated by the difference between the temperature of air drawn into the air conditioner and the temperature of air blown out of the air conditioner. In other words, the control unit 51 changes the rate of increase of the motor speed Nc, or the rate of increase of the frequency of the inverter 53, based on the temperature difference.

If the pressure difference is relatively great when starting the motor M, the cooling load is estimated to be great, and the load torque immediately after the motor M is started is estimated relatively great. In this case, the phase of the motor M may be pulled out of synchronism, that is, the rotation phase of the motor M may be displaced from the phase of the frequency of the inverter 53. In other words, the control unit 51 is likely to fail to start the motor M. Therefore, the control unit 51 extends the period t so that the current frequency is slowly increased to the target frequency. This permits the motor speed Nc to be reliably synchronized with the current frequency without being pulled out of phase.

When the temperature difference is small, the cooling load is estimated to be small, and the load torque immediately after the motor M is started is estimated to be also small. In this case, the motor M is less likely to be pulled out of phase. Therefore, the control unit 51 shortens the period t so that the current frequency is quickly increased to the target frequency. Accordingly, the cooling performance of the compression mechanism C is quickly increased, which suppresses the decrease in the temperature of the blown air.

The illustrated embodiment has the following advantages.

(1) When the energy efficiency of the motor M is predicted to be lower than the predetermined level if the rotation speed control is continued, the control of the motor M is switched from the rotation speed control to the on-off control. This permits the motor M to operate at high energy efficiency. The motor M is not operated at a low speed range that is close to the lowest motor speed that of the inverter control except when the motor speed is increased from or decreased to zero. Therefore, the energy efficiency of the total operation of the compressor is improved. Also, the electricity of the battery 52 is conserved, which extends the period of air conditioning without charging the battery 52. Unlike the case where the motor M is operated only by the rotation speed control, the on-off control permits the compressor to operate at low displacements, which expands the range of the controllable displacement.

(2) When starting the motor M, the rate of increase of the motor speed Nc, or the rate of increase of the current frequency, is changed in accordance with the cooling load on the air conditioner. Therefore, when the motor M is started, the motor M is reliably prevented from being pulled out of phase, which improves the air conditioning performance.

It should be apparent to those skilled in the art that the present invention may be embodied in many other specific forms without departing from the spirit or scope of the invention. Particularly, it should be understood that the invention may be embodied in the following forms.

In the on-off control of the motor M, the rate of increase of the motor speed from zero to the predetermined speed Nc may be adjusted based on the difference between the temperature of refrigerant at the inlet of the evaporator 43 and the temperature at the outlet of the evaporator 43. Also, the rate of increase of the motor speed may be adjusted based on the difference between the high refrigerant pressure (discharge pressure) and the low refrigerant pressure (suction pressure).

During the rotation speed control of the motor M, the control may be periodically switched to the on-off control for a predetermined period to judge whether the on-off control should be started. Specifically, the electric power consumption of each periodic on-off control is compared with the electric power consumption of the rotation control. If the electric power consumption of the on-off control is less than that of the rotation speed control, the control unit 51 judges that the efficiency of the rotation speed control falls below a predetermined level and switches the control to continuous on-off control.

The compression mechanism C need not be the scroll type as in the illustrated embodiment. For example, the compression mechanism C may be piston type.

Therefore, the present examples and embodiments are to be considered as illustrative and not restrictive and the invention is not to be limited to the details given herein, but may be modified within the scope and equivalence of the appended claims.

What is claimed is:

1. A control apparatus for an electric compressor that includes a motor and a compression mechanism driven by the motor, the compressor forming part of a refrigerant circuit of an air conditioner, wherein the control apparatus adjusts the rotation speed of the motor for controlling the amount of refrigerant gas discharged from the compression mechanism per unit time, wherein, when the energy efficiency of the motor is predicted to be lower than a predetermined level, the control apparatus performs on-off control by alternately turning on and off the motor to obtain a required amount of refrigerant gas discharged per unit time, and the energy efficiency of the motor in the on time is higher than the predetermined level.

2. The control apparatus according to claim 1, wherein, when starting the motor during the on-off control, the control apparatus detects the cooling load on the air conditioner, and wherein the control apparatus decreases the rate of increase of the motor speed as the cooling load is high, and increases the rate of increase of the motor speed as the cooling load is low.

3. The control apparatus according to claim 1, wherein the motor is an alternating-current motor, and wherein the control apparatus changes the motor speed by changing the frequency of the current supplied to the motor.

4. The control apparatus according to claim 1, wherein the control apparatus judges whether the motor efficiency is lower than the predetermined level by referring a map that uses the output torque and the rotation speed of the motor as parameters.

5. A control method for controlling an electric compressor that includes a motor and a compression mechanism driven by the motor, the compressor forming part of a refrigerant circuit of an air conditioner, wherein the rotation speed of the motor is adjusted for controlling the amount of refrigerant gas discharged from the compression mechanism per unit time, wherein, when the energy efficiency of the motor is predicted to be lower than a predetermined level, on-off control is performed by alternately turning on and off the motor to obtain a required amount of refrigerant gas discharged per unit time, and the energy efficiency of the motor in the on time is higher than the predetermined level.

6. The control method according to claim 5, wherein, when the motor is started during the on-off control, the cooling load on the air conditioner is detected, and wherein the rate of increase of the motor speed is decreased as the cooling load is high, and the rate of increase of the motor speed is increased as the cooling load is low.

7. The control method according to claim 5, wherein the motor is an alternating-current motor, and wherein the motor speed is changed by changing the frequency of the current supplied to the motor.

8. The control method according to claim 5, wherein whether the motor efficiency is lower than the predetermined level is judged by referring a map that uses the output torque and the rotation speed of the motor as parameters.

* * * * *